US008843562B2

(12) United States Patent
Johnson, II et al.

(10) Patent No.: US 8,843,562 B2
(45) Date of Patent: Sep. 23, 2014

(54) INSTANT MESSAGING HTTP GATEWAY

(75) Inventors: Peter C. Johnson, II, Riverside, CA (US); Brian Dehamer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3695 days.

(21) Appl. No.: 10/765,519

(22) Filed: Jan. 27, 2004

(65) Prior Publication Data
US 2005/0198149 A1    Sep. 8, 2005

(51) Int. Cl.
G06F 15/16    (2006.01)
G06F 15/173    (2006.01)
H04L 29/06    (2006.01)
H04L 29/08    (2006.01)
H04L 12/58    (2006.01)

(52) U.S. Cl.
CPC ............... *H04L 12/58* (2013.01); *H04L 29/06* (2013.01); *H04L 51/04* (2013.01); *H04L 51/02* (2013.01); *H04L 67/02* (2013.01); *H04L 12/5805* (2013.01); *H04L 12/581* (2013.01)
USPC ............................. 709/206; 709/223; 709/224

(58) Field of Classification Search
CPC ....... H04L 12/581; H04L 51/04; H04L 63/08; H04L 29/06; H04L 51/24; H04L 67/04
USPC ......................................... 709/206, 224, 223
See application file for complete search history.

(56) References Cited

U.S. PATENT DOCUMENTS

| | | | | |
|---|---|---|---|---|
| 6,397,253 B1* | 5/2002 | Quinlan et al. | ............... | 709/227 |
| 6,681,229 B1* | 1/2004 | Cason et al. | ................... | 707/101 |
| 6,987,987 B1* | 1/2006 | Vacanti et al. | ............. | 455/556.2 |
| 7,146,404 B2* | 12/2006 | Kay et al. | ....................... | 709/206 |
| 7,225,232 B2* | 5/2007 | Elberse | ........................ | 709/206 |
| 2002/0055973 A1* | 5/2002 | Low et al. | ..................... | 709/204 |
| 2002/0120697 A1* | 8/2002 | Generous et al. | ............. | 709/206 |
| 2002/0133554 A1* | 9/2002 | Checkoway et al. | .......... | 709/206 |
| 2003/0014488 A1* | 1/2003 | Dalal et al. | .................... | 709/204 |
| 2004/0078424 A1* | 4/2004 | Yairi et al. | .................... | 709/203 |
| 2004/0158610 A1* | 8/2004 | Davis et al. | ................... | 709/206 |
| 2004/0186888 A1* | 9/2004 | Samn | ............................. | 709/206 |
| 2005/0138124 A1* | 6/2005 | Klassen et al. | ................ | 709/206 |

* cited by examiner

*Primary Examiner* — Karen Tang

(57) ABSTRACT

In accordance with at least one embodiment, a system comprising an HTTP gateway which is adapted to establish a communication link with an HTTP server. The system further comprises an instant messaging communication subsystem which is adapted to enable communication between a plurality of instant messaging user interfaces coupled to the instant messaging communication subsystem. The HTTP gateway also establishes a communication link with the instant messaging communication subsystem and receives commands from the instant messaging user interfaces. The received commands are converted to HTTP requests, which are then sent to the HTTP server. The HTTP gateway receives HTTP responses to the HTTP requests from the HTTP server and sends the HTTP responses to the instant messaging user interfaces via the instant messaging communication subsystem.

20 Claims, 5 Drawing Sheets

INSTANT MESSAGING HTTP GATEWAY

BACKGROUND

Information is generally transported around the internet using a technology called Hypertext Transfer Protocol ("HTTP"). HTTP servers can receive and process HTTP requests and issue HTTP responses. HTTP requests are generally command-based messages issued when, for example, an internet user clicks on a hyperlink or enters a website address, also referred to as a uniform resource locator ("URL"), on a computing device, such as a desktop computer or portable internet-ready device.

To visit a particular web page, an internet user will typically enter a URL by one of several methods, including entering the URL into an address field, selecting the URL from a list of previously "bookmarked" URLs, or clicking on a hyperlink. This action causes an HTTP request to be sent to an HTTP server. The HTTP server then issues a response to generate a web page, commonly in the form of a language that can be translated into a graphical display for a user. Hypertext Markup Language ("HTML") and Active Server Pages ("ASP") are exemplary languages used for such a purpose.

HTTP responses may incorporate information not stored on the HTTP server. For instance, back-end databases and other data stores may be linked to the HTTP server to supply additional information to be provided in an HTTP response. Such may be the case when a user performs a search on a website. Detailed information may be stored on a back-end database or other data store and provided to the HTTP server for translation into the HTTP response.

HTTP servers can process HTTP requests from fixed locations and portable electronic devices. Many personal digital assistants (PDAs), cell phones and other internet-ready portable electronic devices are capable of interacting with an HTTP server. Generally, operating on the Wireless Access Protocol ("WAP"), the portable electronic device may send a device-specific request to the HTTP server. A WAP gateway may receive the data request and translate it into an HTTP request readable by the HTTP server. The HTTP server may then issue an HTTP response in a language understandable by the WAP device, such as Wireless Markup Language ("WML").

Instant messaging ("IM") technology is used with growing frequency to allow users to message one another at or near real-time. Generally, end-users log in to an IM infrastructure, such as ICQ Instant Messenger, AOL Instant Messenger, Yahoo Messenger or MSN Messenger, using IM client software, which relays user-entered messages from one end-user to another. The term "bot" is derived from the word robot and in general comprises a computer program that acts as an intelligent agent to perform a given task. IM bots are sometimes logged in to IM services, mimicking a human user, to provide greetings and responses to simple commands. Generally, these bots operate from a script located on the IM end-user's computer, which hosts the bot and responds to simple commands via the pathway between the end-user's computer and the IM infrastructure. It is desired to allow an IM bot that is logged into an IM infrastructure to interact, via a HTTP gateway, with an HTTP server and its linked databases to permit the IM bot to provide responses to end-user queries by allowing an end-user to interact with the bot that is logged into the IM system.

SUMMARY

In accordance with at least one embodiment, a system comprising an HTTP gateway which is adapted to establish a communication link with an HTTP server. The system further comprises an instant messaging communication subsystem which is adapted to enable communication between a plurality of instant messaging user interfaces coupled to the instant messaging communication subsystem. The HTTP gateway also establishes a communication link with the instant messaging communication subsystem and receives commands from the instant messaging user interfaces. The received commands are converted to HTTP requests, which are then sent to the HTTP server. The HTTP gateway receives HTTP responses to the HTTP requests from the HTTP server and sends the HTTP responses to the instant messaging user interfaces via the instant messaging communication subsystem.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
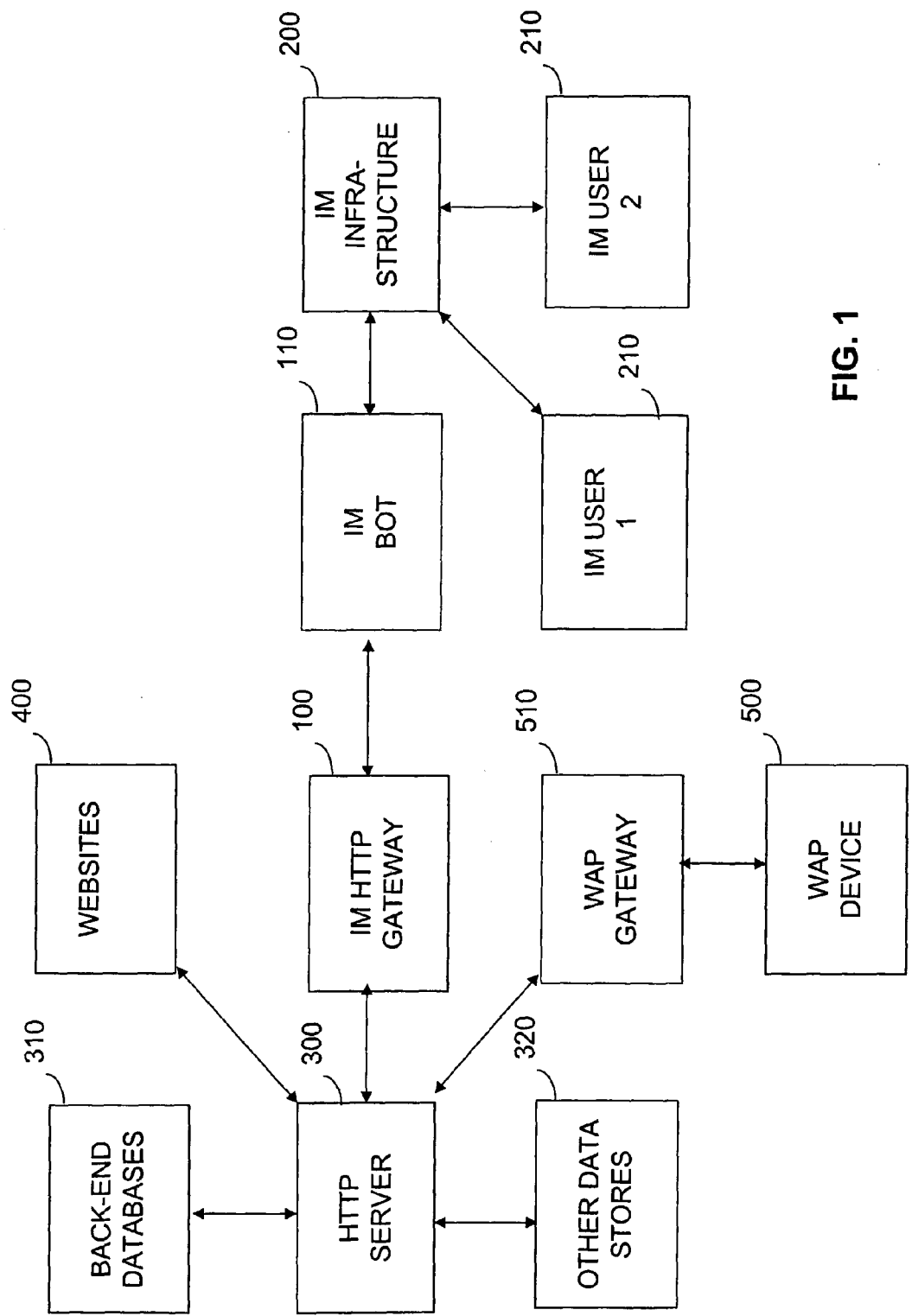
FIG. 1 shows a schematic representation of an exemplary embodiment of an IM HTTP gateway linking an IM infrastructure and an HTTP server.

Referring now to FIG. 1, a representative embodiment is shown of an Instant Messaging (IM) HTTP gateway 100 for linking an IM infrastructure 200 and an HTTP server 300. An IM bot 110 appears on an IM messaging service as another user. However, the bot 110 is a computer program that may log into the IM infrastructure 200 and receive instructions from a human via "IM user" 210, preferably in the form of command-line text. "IM user" is an IM client application program with an interface for interacting with humans. For example, the client application program used by humans to access and use the Yahoo Messenger service may be an IM user. Generally, IM user 210 runs on a human user's computer, such as a desktop PC, laptop or other hand held computing device. A human may interact with IM bot 110, IM infrastructure 200 (e.g., the Yahoo Messenger service) and other IM users via IM user 210. After receiving a user-entered command from IM user 210, IM bot 110 may take programmatic action, such as querying a database 310 and formulating a response to be sent back through the IM infrastructure 200 for viewing by a human via the interface of IM user 210.

The IM HTTP gateway 100 may receive a specifically formatted data request from IM user 210 via IM bot 110, which the gateway 100 translates and relays to the HTTP server 300. While WAP gateways, such as WAP gateway 510, generally translate WAP-enabled, device-specific data requests, the IM HTTP gateway 100 translates IM-infrastructure-specific data requests. Each IM infrastructure 200 (such as Yahoo Messenger or ICQ Instant Messenger) may use a uniquely formatted data request that is used by IM user 210 to send requests to IM HTTP gateway 100. The gateway 100 translates the data requests into an HTTP request that may be processed by HTTP server 300. The HTTP server 300 may contain the requested information or may query back-end databases 310 or other linked data stores 320 for the desired information. The HTTP server 300 may also provide data to various websites 400 and/or WAP devices 500.

In operation, the IM HTTP gateway 100 may read a configuration file, which may be stored on the computer or server housing the gateway 100. The configuration file informs IM HTTP gateway 100 which IM infrastructure(s) 200 to log in to, and which bots 110 to use for that particular login. A single computer program may be used to start each IM bot 110 or a different program may be used to start an IM bot 110. The configuration file may also inform IM HTTP gateway 100 to which HTTP server 300 to forward requests. Furthermore, the configuration file may identify which HTTP paths on the server are to be associated with (or "mapped to") which bots 110 and the commands that may be received from such bots.

After a user 210 logs in to an IM infrastructure 200, the user may enter a specifically formatted command, which is sent as an IM-specific data request through the IM infrastructure 200 to the IM bot 110. The IM bot 110 may then relay the request to the IM HTTP gateway 100, which translates the IM-specific data request into an HTTP request that may be sent to the HTTP server 300. While depicted as two distinct entities in FIG. 1, alternatively, the IM HTTP gateway 100 and IM bot 110 may be combined as a single entity. In such a case, each instance, or bot, may handle conversion of an IM-specific data request into an HTTP request for the HTTP server 300.

After receiving an HTTP request, the HTTP server 300 may then issue an HTTP response back to the IM HTTP gateway 100. The HTTP gateway 100 strips the textual data from the response and reports this text back to the user 210 through IM infrastructure 200. If desired, the HTTP server 300 may be configured such that HTTP server 300 performs extraction of the textual data before sending the HTTP response back through the IM HTTP gateway 100.

Although IM bot 110 is shown in FIG. 1 as linked to a single IM infrastructure 200, an IM bot 110 may log simultaneously in to a plurality of IM infrastructures 200. While each bot 110 has been described as a specific instance of a software application, bot 110 may be logged in to different infrastructures 200 under the same username and with the same associated commands. As previously stated, more than one instance of the same software application may be logged in to an infrastructure 200, thereby providing a distinct bot 110 for each instance, each potentially having its own username and unique associated commands.

All users 210 logged in to a particular IM infrastructure 200 may have access to all bots 110 that are logged in to the IM infrastructure 200. However, each bot 110 may be customized to restrict access to only certain users. Furthermore, each bot 110 may be customized as to which commands the bot will process. Configuration of each bot may be established in the configuration file included within the IM HTTP gateway 100.

Optionally, an HTTP gateway 100 may store settings and other information about a specific user 210. Settings relating to a user 210 may be maintained in a "cookie" file on the HTTP gateway 100. As such, the settings may be maintained between logins and associated with user 210 the next time the user logs in. In an alternative embodiment, the settings may be stored in volatile memory, such as in the random access memory of the computer housing IM user 210. However, such an approach may not allow settings to be maintained in memory between logins, but may require fewer permanent storage resources.

The IM bot 110 may operate in a synchronous fashion, such that data is provided to user 210 when requested (i.e., one command issued by a user 210 provides only one response). However, the IM HTTP gateway 100 also may be configured to provide asynchronous data to user 210 through IM infrastructure 200. IM HTTP gateway 100 may be configured such that one data-request command issued may result in a plurality of responses at various intervals. For example, a user may issue a single command to the IM bot 110 asking the IM HTTP gateway 100 to provide stock prices, and the IM bot 110 may return an updated response once every user specified time period (e.g., 15 minutes). Alternatively, the IM HTTP gateway 100 may be pre-configured to provide asynchronous data replies at default intervals.

Figure 2A:
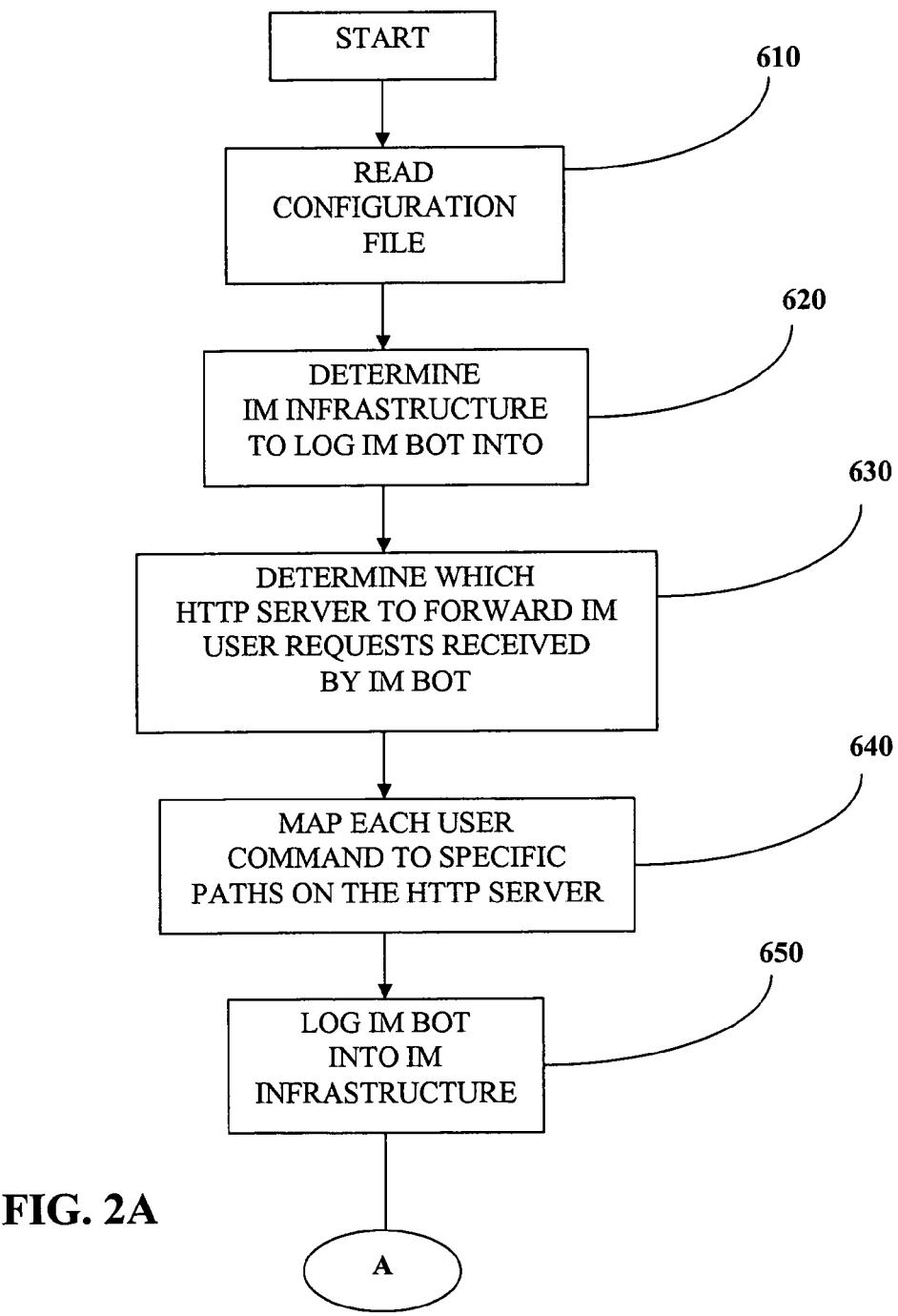
FIGS. 2A, 2B and 2C show a schematic representation of an exemplary embodiment of the procedure that IM HTTP gateway 100 and IM bot 110 perform in processing a data request from IM user 210.
Figure 2B:
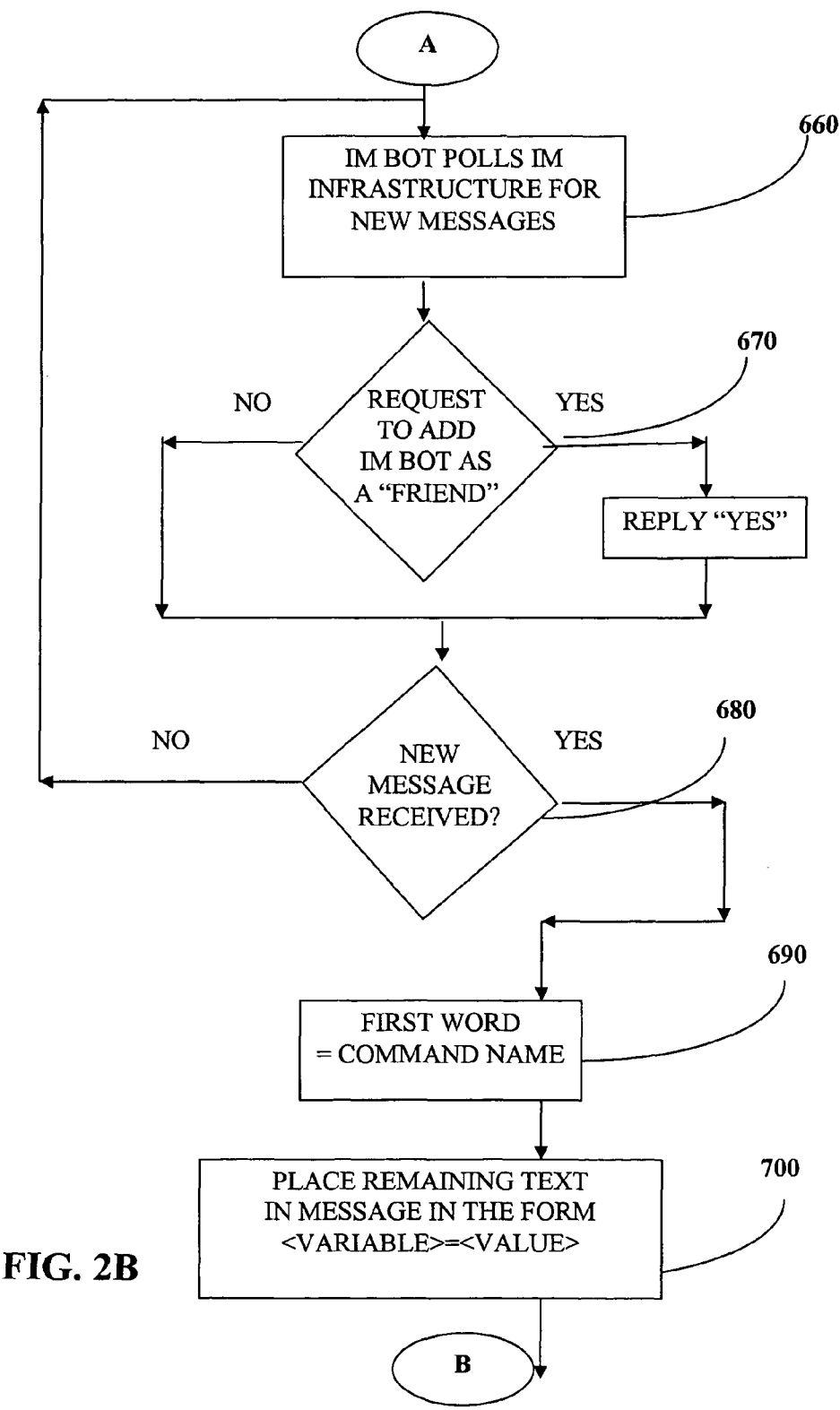
Figure 2C:
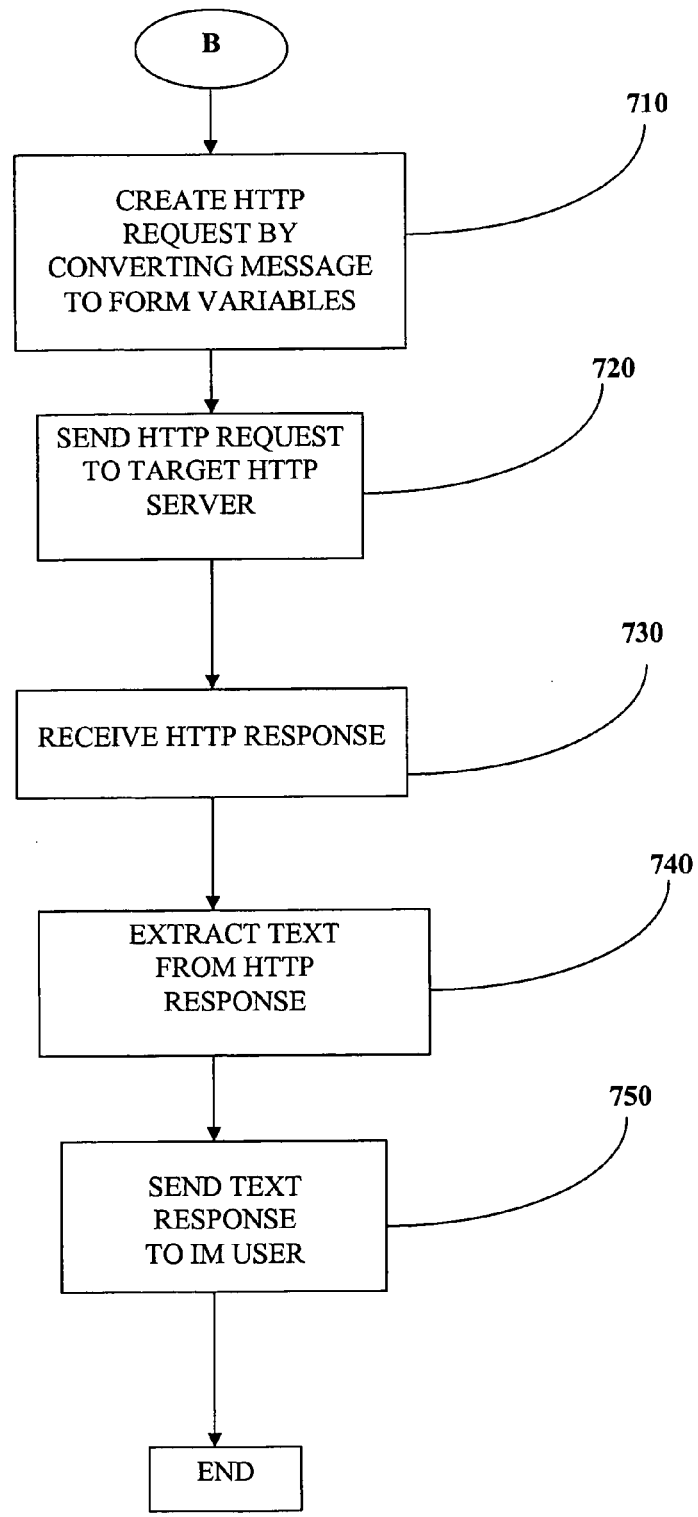

FIGS. 2A, 2B and 2C show a schematic representation of an exemplary embodiment of the procedure that IM HTTP gateway 100 and IM bot 110 perform in processing a data request from IM user 210. Referring now to FIG. 2A, in block 610 IM HTTP gateway 100 may read a configuration file. Based, at least in part, on the information contained in the configuration file, in block 620 IM HTTP gateway 100 may determine the IM infrastructure in which IM bot 110 may be logged into. Also based, at least in part, on the information in the configuration file, IM HTTP gateway 100, in block 630, may determine the appropriate HTTP server 300 to which it may forward requests received by IM bot 110 from IM user 210. In block 640, IM HTTP gateway 100 may map each known user command to a specific path on the HTTP server 300. In block 650, IM HTTP gateway 100 may initiate an instance of IM bot 110 and may log into the selected IM infrastructure 200.

Referring now to FIG. 2B, in block 660 IM bot 110 may poll the IM infrastructure 200 to determine whether it has any new message from any IM user 210. If IM bot 110 receives a request from an IM user 210 to add IM bot 110 as a "friend," then IM bot 110 replies "yes" to that request in block 670. In block 680, IM bot 110 may check to see whether there is any other message. If there is no other message, then IM bot 110 may return to polling IM infrastructure 200 for new messages as depicted in block 660. If IM bot 110 locates a new message from IM user 210, then in block 690 IM HTTP gateway 110 may begin translating the IM user 210 request into an HTTP request which may be sent to HTTP server 300. In some embodiments, the first word of the user request is translated to be the command name. In such embodiments, as depicted in block 700, the remaining text in the message is assumed to be in the form <variable>=<value>. For example, if IM user 210 sends the request "PHONE NAME=JOHN SMITH," then the first word, "PHONE," is recognized as a command that tells the IM HTTP gateway 100 to convert that command into an appropriate database query that will look up the telephone number based on a given name of a person. The remaining text, "NAME=JOHN SMITH," may be translated to mean that the word "NAME" is the <variable> and the text "JOHN SMITH" is the <value> of the <variable> "NAME."

Other formats, schemes or syntax may be used for creation of the IM user 210 requests. For example, instead of the above-described user request in the form of <variable>=<value>, user requests may be implemented using positional variables. With positional variables, the parameter in question may be assumed based on its position relative to other items in the user request message. Using the positional variable scheme, the above example request "PHONE NAME=JOHN SMITH" is replaced with simply "PHONE JOHN SMITH." The position of the words "JOHN SMITH" in the message indicates that it is the <value> of the <variable> "NAME."

Referring now to FIG. 2C, in block 710 the IM HTTP gateway 100 may create an HTTP request based on the request received from IM user 210. In block 720, IM HTTP gateway 100 may send the HTTP request to the target HTTP server 300 in the form of form variables. Other formats may also be used. HTTP server 300 may process the HTTP request and may make any necessary calls to back-end databases 310 or other data stores 320 to formulate an HTTP response. HTTP server 300 may send the HTTP response to the IM HTTP gateway 100. In block 730, IM HTTP gateway 100 may receives the HTTP response from HTTP server 300. In some embodiments, in block 740, IM HTTP gateway 100 may further process the HTTP response by extracting the text portion of the response which corresponds to the answer that is responsive to the request received from IM user 210. In block 750, IM HTTP gateway 100 may, through IM bot 110, send the text response to the appropriate IM user 210 via IM infrastructure 200. IM HTTP gateway 100 may continue processing of other requests from IM user 210 by looping back to block 660 in FIG. 2B and may continue to poll IM infrastructure 200 for new messages from any IM user 210.

As previously stated, in the foregoing discussions any functionality performed by IM HTTP gateway 100 may be performed by IM bot 110 and vice versa. This is because in any given implementation, it is possible that IM HTTP gateway 100 and IM bot 110 may be implemented as one programmatic entity or two different entities. When implemented as two separate entities, the functions performed by each may be assigned based on programmer preference and/or based on application specific or other factors.

Figure 3:
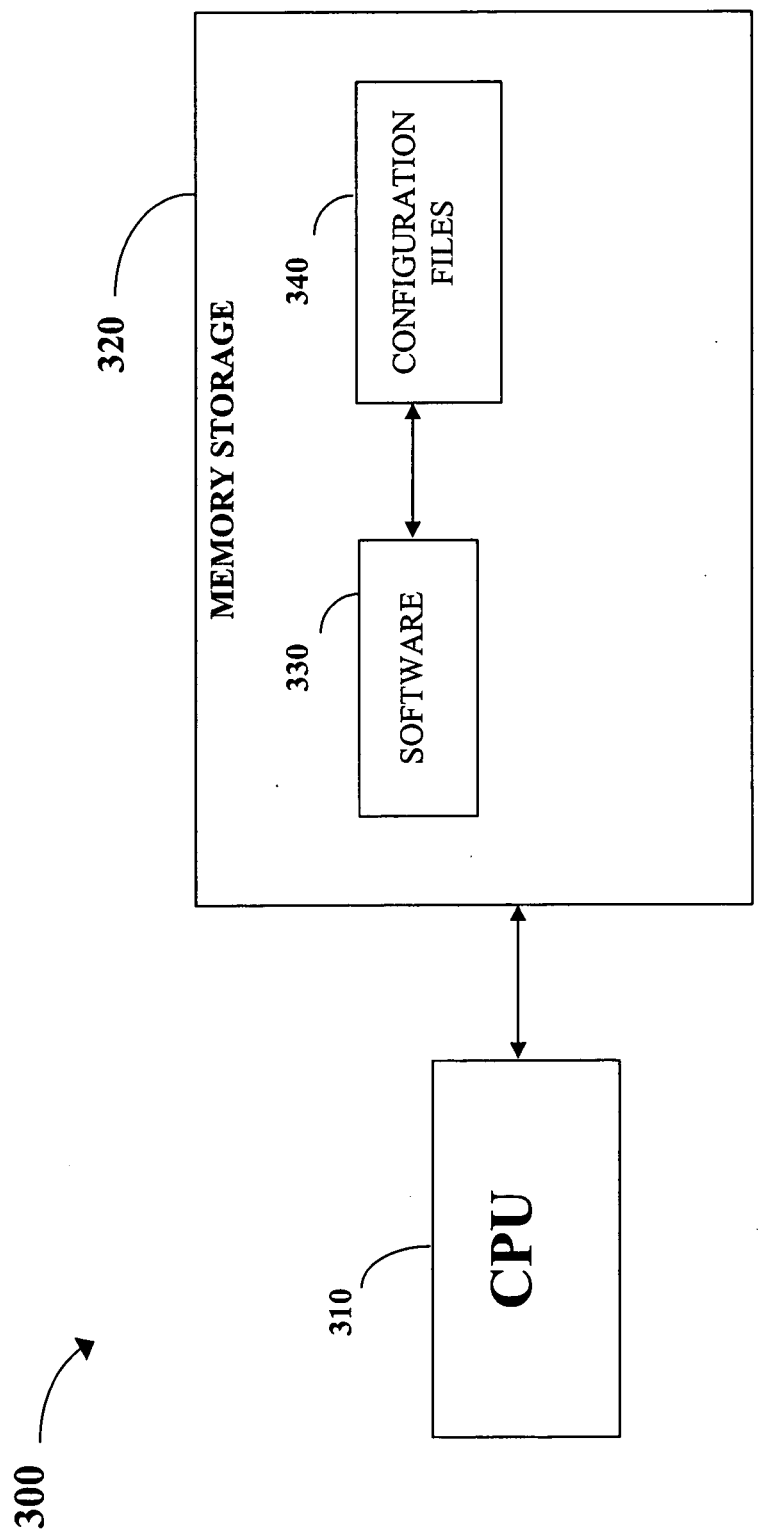
FIG. 3 depicts a computer system that may be used to enable the functionality of IM HTTP gateway 100 and IM bot 110.

FIG. 3 depicts a computer system 300 configured to be an embodiment of IM HTTP gateway 100 discussed above and as depicted in FIG. 1. Computer system 300 comprises a central processing unit ("CPU") 310 coupled to memory storage 320. Memory storage 320 comprises software 330 and configuration files 340. Software 330 comprises computer program(s) for performing the functionality of IM HTTP gateway 100 discussed above and as depicted in FIG. 1. Alternatively, software 330 further comprises computer program(s) for performing the functionality of IM bot 110 discussed above and as depicted in FIG. 1. Configuration files 340 comprise data which informs IM HTTP gateway 100, among other things, which IM infrastructure(s) 200 to log in to, and which IM bots 110 to use for that particular login. CPU 310 may be programmed with instructions from software 330 to perform the functionality of IM HTTP gateway 100 discussed above. Alternatively, CPU 310 also may be programmed with instructions from software 330 to perform the functionality of IM bot 110 discussed above.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    an HTTP gateway adapted to establish a communication link with an HTTP server; and
    an instant messaging communication subsystem adapted to enable communication between a plurality of instant messaging user interfaces coupled to the instant messaging communication subsystem;
    wherein, the HTTP gateway establishes a communication link with the instant messaging communication subsystem and wherein the HTTP gateway is adapted to receive commands from the instant messaging user interfaces, convert the commands to HTTP requests, send the HTTP requests to the HTTP server, receive HTTP responses to the HTTP requests from the HTTP server, and send the HTTP responses to the instant messaging user interfaces via the instant messaging communication subsystem;
    wherein the HTTP gateway selects said instant messaging communication subsystem from among a plurality of instant messaging communication subsystems using a configuration file of the HTTP gateway stored on the system.

2. The system of claim 1, further comprising at least one instant messaging bot, wherein the HTTP gateway is coupled to the instant messaging communication subsystem via the at least one instant messaging bot and the instant messaging bot receives the commands from the instant messaging user interfaces and sends HTTP responses to the user interfaces via the instant messaging communication subsystem.

3. The system of claim 1, further comprising a back-end database connected to the HTTP server, wherein the HTTP server is adapted to query the back-end database in preparing the HTTP responses.

4. The system of claim 1, wherein the HTTP gateway further comprises a configuration file, and further wherein the configuration file is usable to determine with which of a plurality of HTTP servers the gateway establishes said communication link.

5. The system of claim 1, wherein the HTTP gateway is adapted to map the HTTP requests to specific paths on the HTTP server.

6. The system of claim 1, wherein the HTTP gateway polls the instant messaging communication subsystem for the commands from the instant messaging user interfaces.

7. The system of claim 1, wherein conversion of commands from instant messaging user interfaces into the HTTP requests comprises creation of form variables by the HTTP gateway based on the commands.

8. The system of claim 1, wherein the HTTP gateway extracts text portions of the HTTP responses and communicates the text portions to the instant messaging user interfaces.

9. A method, comprising:
    transmitting commands from a plurality of instant messaging user interfaces to an HTTP gateway via an instant messaging communication subsystem;

converting the commands to HTTP requests;
transmitting the HTTP requests to an HTTP server;
generating HTTP responses to the HTTP requests; and
transmitting the HTTP responses to the instant messaging user interfaces via the instant messaging communication subsystem;
wherein transmitting commands from the plurality of instant messaging user interfaces to the HTTP gateway comprises accessing a configuration file to determine with which of a plurality of instant messaging communication subsystems the gateway establishes said communication link.

10. The method of claim 9, wherein transmitting commands from a plurality of instant messaging user interfaces comprises receiving the commands via an instant messaging bot and forwarding the commands from the bot to the HTTP gateway.

11. The method of claim 9, wherein generating HTTP responses to the HTTP requests comprises querying a back-end database.

12. The method of claim 9, wherein transmitting the HTTP requests to the HTTP server comprises mapping the HTTP requests to specific paths on the HTTP server.

13. The method of claim 9, wherein transmitting commands from a plurality of instant messaging user interfaces to the HTTP gateway comprises polling the instant messaging communication subsystem for the commands.

14. The method of claim 9, wherein converting the commands to HTTP requests comprises creating form variables by the HTTP gateway based on the commands.

15. The method of claim 9, wherein transmitting the HTTP responses to the instant messaging user interfaces comprises extracting text portions of the HTTP responses and communicating the text portions to the instant messaging user interfaces.

16. A system comprising:
means for establishing a communication link between an HTTP gateway and an HTTP server;
means for transmitting commands from a plurality of instant messaging user interfaces coupled to an instant messaging communication subsystem to the HTTP gateway via at least one instant messaging bot;
means for converting the commands to HTTP requests;
means for transmitting the HTTP requests to the HTTP server;
means for generating HTTP responses to the HTTP requests; and
means for transmitting the HTTP responses via the at least one instant messaging bot to the instant messaging user interfaces;
wherein the HTTP gateway selects said instant messaging communication subsystem from among a plurality of instant messaging communication subsystems using a configuration file of the HTTP gateway stored on the system.

17. The system of claim 16, wherein generating HTTP responses to the HTTP requests comprises a means for querying a back-end database.

18. The system of claim 16, wherein transmitting the HTTP requests to the HTTP server comprises a means for mapping the HTTP requests to specific paths on the HTTP server.

19. A gateway, comprising:
a CPU;
a storage device coupled to the CPU and containing executable code;
wherein, upon executing the code, the processor receives commands from instant messaging user interfaces, converts the commands to HTTP requests, sends the HTTP requests to an HTTP server, receives HTTP responses from the HTTP server, and sends the HTTP responses to the instant messaging user interfaces via an instant messaging communication subsystem;
a configuration file, wherein the CPU accesses data in the configuration file to determine with which of a plurality of instant messaging subsystems the gateway establishes a communication link;
wherein the configuration file is usable to determine to which of a plurality of HTTP servers the gateway sends said HTTP requests.

20. A gateway as recited in claim 19, wherein the CPU further comprises executable code for an instant messaging bot, wherein the instant messaging bot receives commands from the instant messaging user interfaces and sends HTTP responses to the users interfaces via the instant messaging communication subsystem.

* * * * *